US008710972B2

(12) United States Patent
Son

(10) Patent No.: US 8,710,972 B2
(45) Date of Patent: Apr. 29, 2014

(54) SYSTEM FOR ALARMING UPON OCCURRENCE OF SECESSION OF SMART KEY FOR VEHICLES

(76) Inventor: Soon-Ho Son, Busan (KR)

( * ) Notice: Subject to any disclaimer, the term of this patent is extended or adjusted under 35 U.S.C. 154(b) by 195 days.

(21) Appl. No.: 13/370,108

(22) Filed: Feb. 9, 2012

(65) Prior Publication Data

US 2012/0268264 A1 Oct. 25, 2012

(30) Foreign Application Priority Data

Apr. 15, 2011 (KR) .................. 10-2011-0034957

(51) Int. Cl.
*H04B 7/00* (2006.01)
*B60R 25/24* (2013.01)

(52) U.S. Cl.
CPC .................................... *B60R 25/24* (2013.01)
USPC ......................... 340/457; 455/41.2

(58) Field of Classification Search
CPC .... B06R 25/24; G07C 9/00309; H04W 84/18
USPC ......... 340/457, 426.15, 426.16, 539.21, 5.62, 340/5.64, 5.72, 5.61, 12.5; 455/41.2
See application file for complete search history.

(56) References Cited

U.S. PATENT DOCUMENTS

| | | | | |
|---|---|---|---|---|
| 6,744,349 | B1 * | 6/2004 | Asakura et al. | 340/5.62 |
| 6,998,958 | B2 * | 2/2006 | Asakura et al. | 340/5.61 |
| 7,068,152 | B2 * | 6/2006 | Hager | 340/426.15 |
| 8,019,322 | B2 * | 9/2011 | Satou | 455/411 |
| 8,232,870 | B2 * | 7/2012 | Yoshizawa | 340/426.15 |
| 2011/0065375 | A1 * | 3/2011 | Bradley | 455/1 |
| 2012/0197508 | A1 * | 8/2012 | Seaman et al. | 701/102 |

* cited by examiner

*Primary Examiner* — John A Tweel, Jr.
(74) *Attorney, Agent, or Firm* — John K. Park; Park Law Firm

(57) ABSTRACT

The present invention relates to a system for alarming upon occurrence of secession of a smart key for a vehicle, in which wireless communication technology called near field communication (NFC) is applied to both a vehicle and a smart key such that a situation can be prevented in which a driver loses a smart key or does not carry it during the driving. The inventive system includes a signal generation unit, a signal response unit, a signal analysis unit, and an alarm generation unit. Thus, when the smart key secedes from the vehicle by a predetermined distance or the signal generation unit does not receive the response signal from the signal response unit in a state in which the engine of the vehicle is started, an alarm signal is produced from the alarm generation unit.

3 Claims, 3 Drawing Sheets

SYSTEM FOR ALARMING UPON OCCURRENCE OF SECESSION OF SMART KEY FOR VEHICLES

CROSS-REFERENCE TO RELATED APPLICATIONS

This application claims the benefit of Korean Patent Application No. 10-2011-0034957, filed on Apr. 15, 2011 in the Korean Intellectual Property Office, which is incorporated herein by reference in its entirety.

BACKGROUND OF THE INVENTION

1. Field of the Invention

Exemplary embodiments of the present invention relates to a secession alarm system of a smart key for a vehicle, and more particularly, to a system for alarming upon occurrence of secession of a smart key for a vehicle, in which wireless communication technology called near field communication (NEC) is applied to both a vehicle and a smart key such that a situation can be prevented in which a driver loses a smart key or does not carry it during the driving.

2. Description of Related Art

In recent years, along with generalization of a smart key system for a vehicle, a driver can open a vehicle door at the outside of a vehicle even without inserting a separate key into a door lock. Further, the driver can determine whether or not a smart key is placed inside the vehicle. If it is determined that the smart key is placed inside the vehicle, the driver can start the engine of the vehicle only by the manipulation of a start button switch of the smart key without any operation of the key into a key slot.

Such a function by the smart key is performed in such a manner that when the driver approaches the vehicle and operates a door opening/closing switch of the smart key, a door antenna mounted on a door handle senses the operation of the smart key to open the vehicle door.

In addition, when a driver carrying the smart key sits on a driver seat and operates the start button switch of the smart key, an indoor antenna senses the operation of the smart key that the driver carries to control the vehicle engine to be started up.

The smart key for vehicles is set to output an encrypted radio frequency signal so as to be operated in cooperation with the indoor antenna, and is configured to be operated only when there is a match between the encoded signals of the smart and the indoor antenna, which are transmitted and received wirelessly.

The demand for the smart key system for vehicles as described above is increased gradually due to convenience in opening/closing the door and starting up the engine, and a variety of products having similar functions to those of the smart key are put on the market.

However, for such a conventional smart key system for vehicles, there frequently occurs a problem involved in a typical driving habit of drivers.

That is, in the case where a vehicle driver requests his or her acquaintance to start up the engine while giving his or her smart key to the acquaintance in a parking lot or during the wintertime, the driver drives his or her started vehicle toward a destination inadvertently in a state where the acquaintance who have started up the engine does not return the driver the smart key unintentionally.

Like this, in the case where the driver drives the vehicle unintentionally in a state of not carrying the smart key, when he or she stops at a rest area for a short while, or parks or stops the vehicle at a place for some time on business on his or her way to the destination, a lock device does not work and the re-start of the engine is difficult if he or she stops the start of the engine, which makes it impossible to drive the vehicle again.

In this case, the driver cannot re-start the engine until the driver gets in touch with his or her acquaintance who carries the smart key unintentionally so that the acquaintance brings it to a place where the vehicle stops. Moreover, a problem may occur in that the vehicle must be towed inevitably in the worst situation.

Particularly, a designated-driver-for-hire service called "dae-ri-un-jeon" for when you've had too much to drink is recently becoming more common in Korea. When a vehicle driver calls for a rentable sober driver or a designated driver for hire, he or she will come to the vehicle driver's location and receive a smart key from the vehicle driver to drive the vehicle driver's home while carrying it. In this case, in the case where the rentable sober driver moves to a next place with him or her carrying the smart key unintentionally after the designated-driver-for-hire service has been complete, the smart key may be lost.

In addition, it is usual that a vehicle driver carries a smart key in his or her overcoat. Most drivers get on their vehicles and drive the vehicles after taking off their overcoats and placing them on a passenger seat or a rear seat. In this situation, the drivers often stop their vehicles for a short while on business with the engine being started. At this time, the drivers mostly get off their vehicles involuntarily in a state of not being aware of where the smart key is placed.

Like this, a vehicle driver gets off his or her vehicle for his or her business in a state of not being aware of the location of the smart key or thinking that he or she always carries it. Thus, a problem is caused in that the vehicle is left in a defenseless state with the engine being turned on for a given time period during the business.

That is, the conventional smart key system equipped in a vehicle encounters a problem in that if a smart key is positioned inside the vehicle, everyone can open the vehicle door and start the engine simply, and thus valuables in the vehicle may be stolen and even theft of a vehicle may occur.

SUMMARY OF THE INVENTION

Accordingly, the present invention has been made in order to solve the above-mentioned problems occurring in the prior art, and it is an object of the present invention to provide a system for alarming on occurrence of secession of a smart key for a vehicle, which can prevent a situation in which a vehicle driver secedes from his or her vehicle in a state of not being aware of the fact that he or she carries the smart key due to an acquaintance or an occupant such that the smart key is lost unintentionally, or in which the driver drives his or her vehicle in a state of not carrying the smart key.

Another object of the present invention is to provide a system for alarming on occurrence of secession of a smart key for a vehicle, which can prevent a situation in which a vehicle adopting a smart key system is left in a defenseless state by an intruder due to carelessness of a driver when the vehicle is parked or stopped.

The objects to be accomplished by the prevent invention are not limited to the above objects, and other objects will be clearly understood by a person skilled in the art from the following detailed description.

To accomplish the above object, according to one aspect of the present invention, there is provided a system for alarming on occurrence of secession of a smart key for a vehicle, which is configured to operate a vehicle automatic device using the smart key to perform the startup of the vehicle engine or the automatic opening/closing of the door, the system including: a signal generation unit installed at the vehicle and configured to periodically generate a wireless communication signal based on a regular rule; a signal response unit installed at the smart key and configured to receive the wireless communication signal from the signal generation unit and generate a response signal in response to the received wireless communication signal for transmission to the signal generation unit; a signal analysis unit electrically connected to the signal generation unit and configured to analyze the response signal transmitted to the signal generation unit according to a predetermined condition; and an alarm generation unit configured to produce a predetermined alarm signal based on a result of the analysis of the signal analysis unit, whereby when the smart key secedes from the vehicle by a predetermined distance or the signal generation unit does not receive the response signal from the signal response unit in a state in which the engine of the vehicle is started, the alarm signal is produced from the alarm generation unit.

According to a preferred embodiment of the present invention, preferably, the alarm generation unit may be installed inside the vehicle in the form of a module and the alarm signal may be configured in a visible, audible, or vibration manner.

According to a preferred embodiment of the present invention, preferably, the alarm generation unit may be installed inside the smart key in the form of a module and the alarm signal may be configured in a visible, audible, or vibration manner.

According to a preferred embodiment of the present invention, preferably, the system may further include a position-tracking unit installed at the vehicle and having a GPS map embedded therein, the position-tracking unit being configured to receive a GPS coordinate through a GPS module mounted at the smart key and display information regarding the position of the smart key thereon.

According to a preferred embodiment of the present invention, preferably, the system may further include a boarding detection unit configured to detect whether or not a passenger including a driver has boarded the vehicle, whereby when it is detected by the boarding detection unit that no passenger has boarded the vehicle in a state in which the smart key is positioned in the vehicle, the alarm signal is produced from the alarm generation unit.

As constructed and operated above, the present invention has the following advantageous effects. When a driver carrying the smart key secedes from the vehicle by a predetermined distance, an alarm signal is caused to be produced from the alarm generation unit such that the driver can be immediately aware of the fact that he or she moves while carrying the smart key, and can check the status of the vehicle again through this awareness.

In addition, even when an occupant or a designated driver for hire other than the driver secedes from the vehicle by a predetermined distance while carrying the smart key of the vehicle driver involuntarily, an alarm signal is also caused to be produced from the alarm generation unit such that a situation can be prevented in which the smart key may be lost unintentionally by a stranger other than the vehicle owner.

BRIEF DESCRIPTION OF THE DRAWINGS

The above and other objects, features and advantages of the present invention will be apparent from the following detailed description of the preferred embodiments of the invention when taken in conjunction with the accompanying drawings, in which.

EXPLANATION ON SYMBOLS

Figure 1:
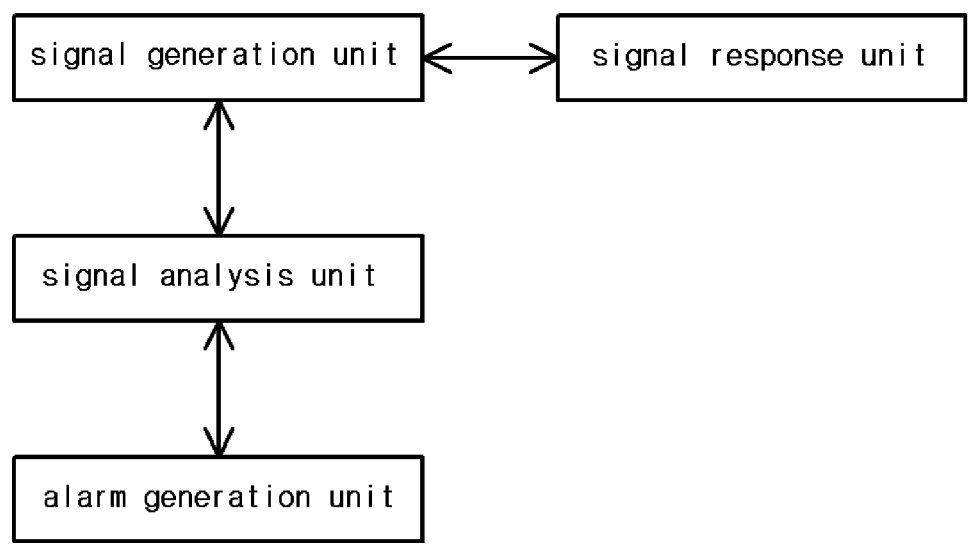
FIG. 1 is a block diagram illustrating a system for alarming on occurrence of secession of a smart key for a vehicle according to an embodiment of the present invention.
Figure 2:
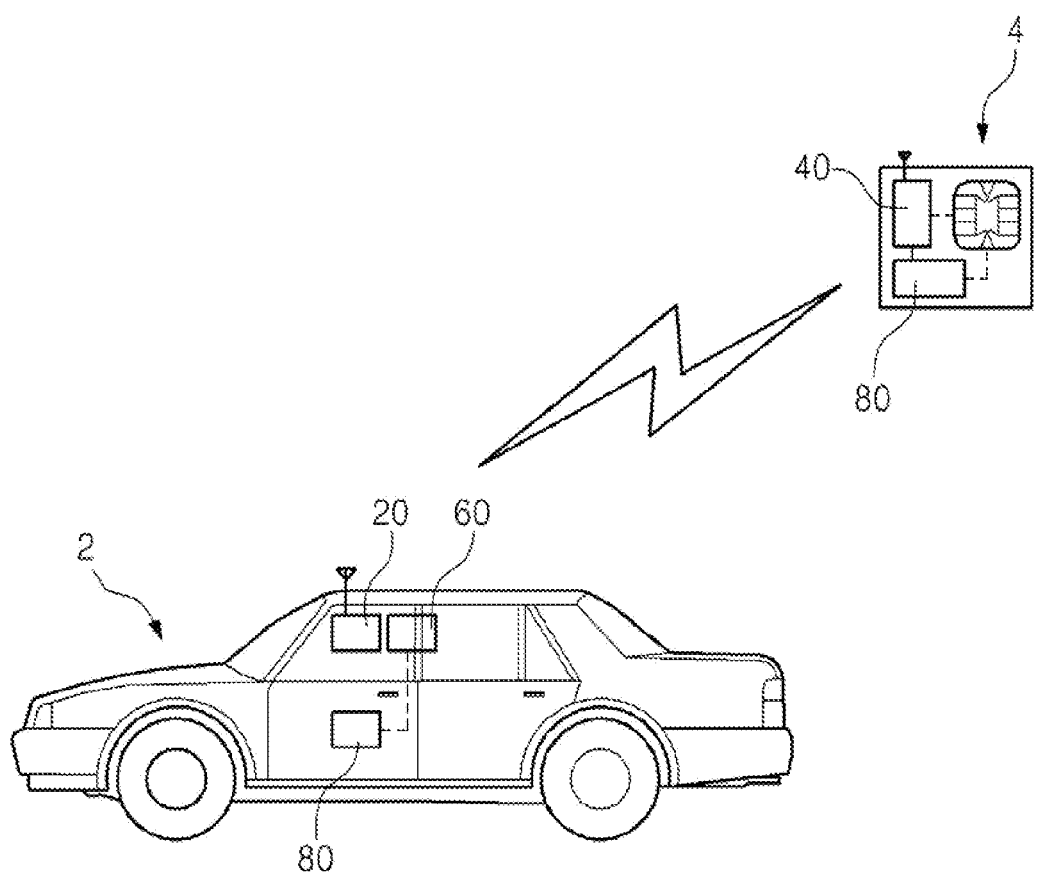
FIG. 2 is a schematic diagrammatic view illustrating a system for alarming on occurrence of secession of a smart key for a vehicle according to an embodiment of the present invention.
Figure 3:
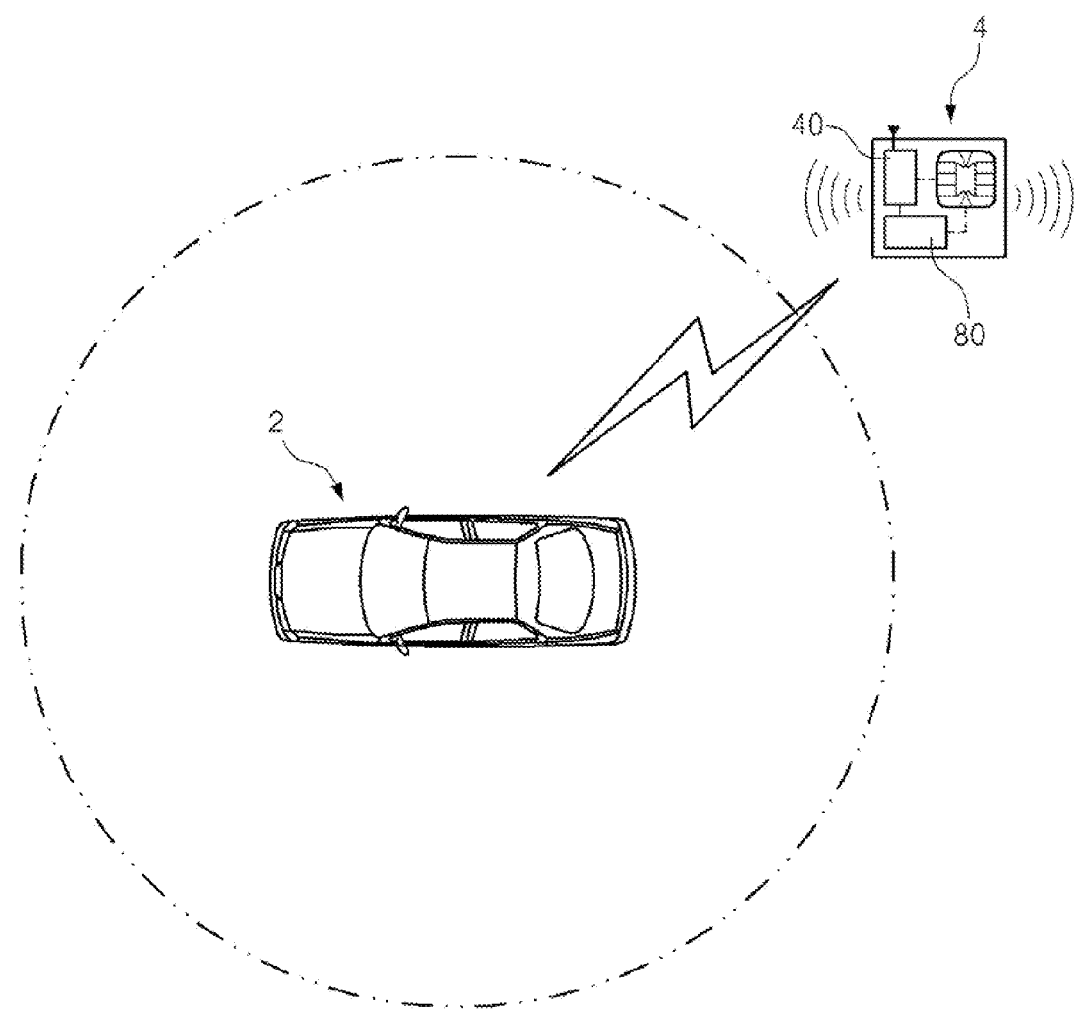
FIG. 3 is a conceptual view illustrating a system for alarming on occurrence of secession of a smart key for a vehicle according to an embodiment of the present invention.

| 2: vehicle | 4: smart key |
| 20: signal generation unit | 40: signal response unit |
| 60: signal analysis unit | 80: alarm generation unit |

DETAILED DESCRIPTION

A preferred embodiment of the present invention will now be described hereinafter in detail with reference to the accompanying drawings.

The above and other aspects, features, and advantages of the present invention will be more apparent from the following detailed description when taken in conjunction with the accompanying drawings.

Terms and words used in the detailed description and the claims should not be construed as a typical or dictionary meaning, but should be interpreted as the meaning and concept conforming to the technical idea of the present invention based on the principle that the inventor can properly define the concept of the terms to explain his or her invention in the best way.

In addition, it will be obvious to a person of ordinary skill in the art that the prevent invention can be carried out even without specific items like elements constituting a concrete circuit in the following detailed description.

Referring to the drawings, a system for alarming on occurrence of secession of a smart key for a vehicle according to the present invention includes: a signal generation unit 20 installed at the vehicle 2 and configured to periodically generate a wireless communication signal based on a regular rule; a signal response unit 40 installed at the smart key 4 and configured to receive the wireless communication signal from the signal generation unit 20 and generate a response signal in response to the received wireless communication signal for transmission to the signal generation unit 20; a signal analysis unit 60 electrically connected to the signal generation unit 20 and configured to analyze the response signal transmitted to the signal generation unit 20 according to a predetermined condition; and an alarm generation unit 80 configured to produce a predetermined alarm signal based on a result of the analysis of the signal analysis unit 60.

According to the system of the prevent invention as constructed above, when the smart key 4 secedes from the vehicle 2 by a predetermined distance or the signal generation unit 20 does not receive the response signal from the signal response unit 40 in a state in which the engine of the vehicle 2 is started, the alarm signal is produced from the alarm generation unit 80.

The respective elements constituting the present invention will be described hereinafter in detail.

First, the signal generation unit 20 and the signal response unit 40 will be described hereinafter.

The signal generation unit 20 and the signal response unit 40 are kinds of near field communication means, which transmit and receive an encrypted radio signal to and from each other by a mutually agreed communication method.

A near field communication method, which can be applied to the signal generation unit 20 and the signal response unit 40, may include radio-frequency identification (RFID) technology.

The signal generation unit 20 may be implemented as an RFID transmitting and receiving module that transmits and receives a radio frequency signal, and the signal response unit 40 may be implemented as a tag having predetermined identification information stored therein.

The tag includes an antenna and an integrated circuit having information recorded therein such that the tag transmits and receives the information to and from the RFID transmitting and receiving module through the antenna. This information is used to identify an object to which the tag is to be mounted, i.e., the smart key. In other words, the tag performs a similar function to that of a barcode. The RFID technology uses a radio wave unlike the barcode technology in which light is used to read out information. Thus, the tag can be read even at a remote place as well as can be operated within a short range like a barcode reader. In addition, the RFID technology may enable the radio wave to pass through an object to receive information.

The RFID transmitting and receiving module registers the identification information of the tag and sets a threshold secession distance of the registered tag such that a distance between the vehicle and the smart key is measured through the short-range communication between the RFID transmitting and receiving module and the tag.

An example of measurement of the distance between the vehicle and the smart key will be described below.

The propagation time taken to transmit and receive a radio signal between the RFID transmitting and receiving module and the registered tag is measured, and the distance between the vehicle and the smart key can be measured periodically based on the measured propagation time.

In addition, an example of measurement of the distance between the vehicle and the smart key based on the measured propagation time will be described below.

The distance (=propagation speed.times.propagation time) between the vehicle and the smart key may be calculated from the measured propagation time and a predefined propagation speed, or may be calculated from the measured propagation time by referring to a pre-stored time and distance relationship table.

A radio communication method such as Bluetooth or infrared ray communication as well as the above-mentioned RFID short-range communication may be applied to the signal generation unit 20 and the signal response unit 40, and it will be able to be selected properly and applied to the signal generation unit 20 and the signal response unit 40 by a person skilled in the art depending on the manufacturing costs and the application range.

The Bluetooth or infrared ray communication method is a well-known and widely used technique in the art similarly to the above-mentioned RFID short-range communication, and thus the detailed description thereof will be omitted to avoid redundancy.

Next, the signal analysis unit 60 and the alarm generation unit 80 will be described hereinafter.

The signal analysis unit 60 serves to calculate the distance between the signal generation unit 20 and the signal response unit 40, i.e., the distance between the vehicle 2 and the smart key 4 to determine whether or not an alarm will be produced. If the secession distance of the smart key 4 from the vehicle 2 exceeds a reference distance value previously stored in the signal analysis unit 60 or the response signal from the signal response unit 40 is not received by the signal generation unit 20, the signal analysis unit 60 delivers an instruction to the alarm generation unit 80 such that the alarm generation unit 80 is operated to produce an alarm signal.

The signal generation unit 20 may be implemented as a micro processor unit (MPU) module, which is a sort of central processing unit (CPU) including a memory circuit, a calculation circuit, a control circuit, and the like in a single chip. Also, the signal generation unit 20 is a high capacity logic circuit that is configured to perform a function of a conventional general purpose computer and to enable multi-purpose programming.

In addition, the alarm generation unit 80 may be installed inside the vehicle 2 or the smart key 4 in the form of a module, and the alarm signal may be configured in a visible, audible, or vibration manner such that an occupant who has boarded the vehicle 2 or a person carrying the smart key 4 with him or her having seceded from the vehicle by a given distance can recognize the alarm signal.

In the case where the alarm generation unit 80 is installed inside the vehicle 2, it is preferably constructed in such a manner that a speaker and a display are mounted thereon. When the smart key 4 secedes from the vehicle by a predetermined range, an alarm sound and an alarm phrase are caused to be simultaneously outputted such that an occupant in the vehicle 4 can easily recognize an alarm signal.

Meanwhile, in the case where the alarm generation unit is installed inside the smart key 4, it is preferably constructed in such a manner that a speaker and a vibration means are mounted thereon. When the smart key 4 secedes from the vehicle by a predetermined range, an alarm sound and a vibration are caused to be simultaneously outputted such that a person carrying the smart key 4 can easily recognize an alarm signal.

It is of course to be noted that the alarming method of the alarm generation unit 80 installed inside the vehicle 2 of the smart key 4 in the form of a module is not limited to the above-mentioned manner, but the alarm generation unit 80 may be selected and installed in various alarming manners by a person skilled in the art.

Next, the construction of an element of the system of the present invention that can be further included in the vehicle 2 will be described hereinafter.

First, the system for alarming on occurrence of secession of a smart key for a vehicle according to the present invention further includes a position-tracking unit installed at the vehicle 2 and having a GPS map embedded therein. The position-tracking unit serves to receive a GPS coordinate through a GPS module mounted at the smart key and display information regarding the position of the smart key thereon.

In other words, the position-tracking unit is configured to cope with when a person carrying the smart key secedes from the vehicle 2 by a predetermined distance while neglecting an alarm signal being produced or a vehicle driver does not get in touch with the smart key carrying person. This configuration of the position-tracking unit can be used usefully when the smart key 4 is lost inadvertently.

In addition, the system for alarming on occurrence of secession of a smart key for a vehicle according to the present invention further includes a boarding detection unit that detects whether or not a passenger including a driver has boarded the vehicle, so that when it is detected by the boarding detection unit that no passenger has boarded the vehicle in a state in which the smart key is positioned in the vehicle, an alarm signal is produced from the alarm generation unit 80. The boarding detection unit is configured to prevent the following situation.

There may occur a case where a driver who has alone boarded the vehicle drives in a state of placing the smart key 4 inside the vehicle 2, and stops the vehicle for a short while on small business in a state in which the smart key is placed inside the vehicle, i.e., a state in which the engine is being started and the door can be opened by an intruder freely without restraint, which causes the vehicle 2 to be in a defenseless state. In this case, valuables in the vehicle 2 may be stolen or even theft of a vehicle may occur. As mentioned above, when it is detected by the boarding detection unit that no passenger has boarded the vehicle 2 in a state in which the smart key is positioned in the vehicle, an alarm signal is produced from the alarm generation unit 80 such that the driver can recognize this and cope with an urgency situation.

As described above, according to the present invention, when a driver carrying the smart key 4 secedes from the vehicle 2 by a predetermined distance, an alarm signal is caused to be produced from the alarm generation unit 80 such that the driver can be immediately aware of the fact that he or she moves while carrying the smart key 4, and can check the status of the vehicle 2 again through this awareness.

Further, even when an occupant or a designated driver for hire other than the driver secedes from the vehicle by a predetermined distance while carrying the smart key 4 of the vehicle driver involuntarily, an alarm signal is also caused to be produced from the alarm generation unit 80 such that a situation can be prevented in which the smart key 4 may be lost unintentionally by a stranger other than the vehicle owner.

The foregoing has outlined rather broadly the more pertinent and important features of the present invention in order that the detailed description of the invention that follows may be better understood so that the present contribution to the art can be more fully appreciated. It should be appreciated by those skilled in the art that the conception and the specific embodiment disclosed may be readily utilized as a basis for modifying or designing other structures for carrying out the same purposes of the present invention While the preferred embodiments of the present invention has been shown and described with reference to the accompanying drawings, they are merely illustrative embodiments, and the invention is not limited to these embodiments. It is to be understood by a person having an ordinary skill in the art that various equivalent modifications and variations of the embodiments can be made without departing from the spirit and scope of the present invention. Therefore, various embodiments of the present invention are merely for reference in defining the scope of the invention, and the true technical scope of the present invention should be defined by the technical spirit of the appended claims.

What is claimed is:

1. A system for alarming on occurrence of secession of a smart key for a vehicle, which is configured to operate a vehicle automatic device using the smart key to perform the startup of the vehicle engine or the automatic opening/closing of the door, the system comprising:
    a signal generation unit installed at the vehicle and configured to periodically generate a wireless communication signal based on a regular rule;
    a signal response unit installed at the smart key and configured to receive the wireless communication signal from the signal generation unit and generate a response signal in response to the received wireless communication signal for transmission to the signal generation unit;
    a signal analysis unit electrically connected to the signal generation unit and configured to analyze the response signal transmitted to the signal generation unit according to a predetermined condition; and
    an alarm generation unit configured to produce a predetermined alarm signal based on a result of the analysis of the signal analysis unit,
    whereby when the smart key secedes from the vehicle by a predetermined distance or the signal generation unit does not receive the response signal from the signal response unit in a state in which the engine of the vehicle is started, the alarm signal is produced from the alarm generation unit.

2. The system according to claim 1, wherein the alarm generation unit is installed inside the vehicle in the form of a module and the alarm signal is configured in a visible, audible, or vibration manner.

3. The system according to claim 1, wherein the alarm generation unit is installed inside the smart key in the form of a module and the alarm signal is configured in a visible, audible, or vibration manner.

* * * * *